No. 744,328. PATENTED NOV. 17, 1903.
T. FRTSCHEK.
HAY OR STRAW CUTTER.
APPLICATION FILED MAY 4, 1903.
NO MODEL. 2 SHEETS—SHEET 1.
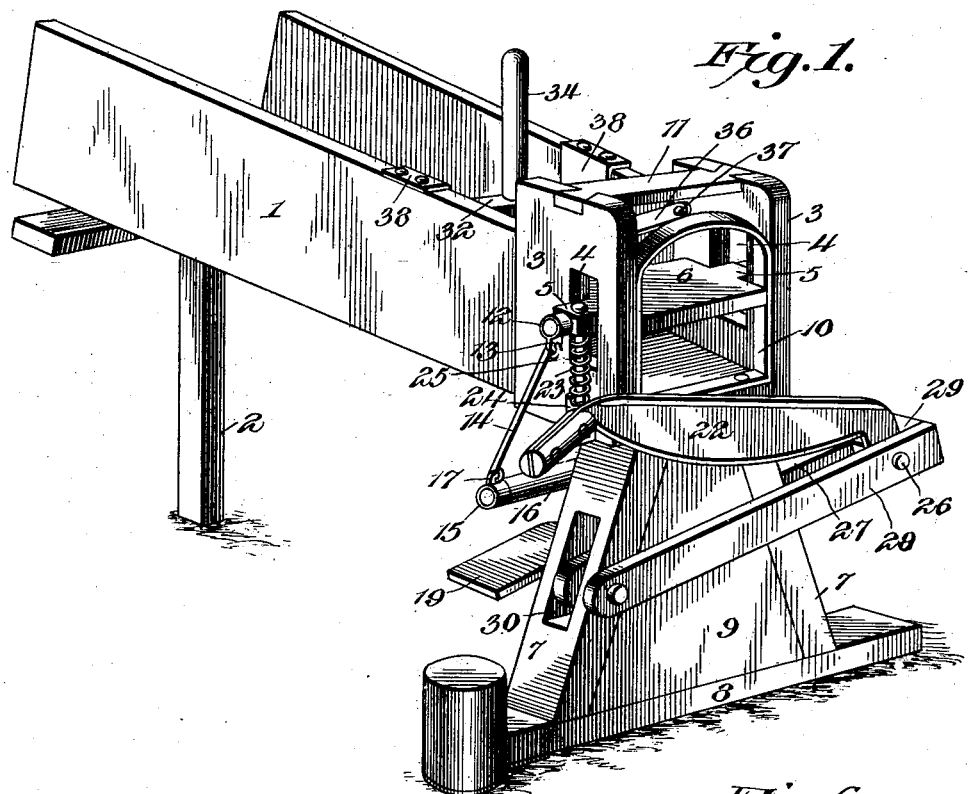
Fig. 1.
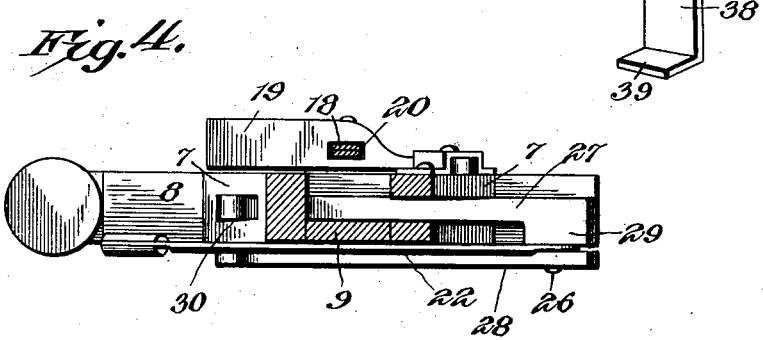
Fig. 6.
Fig. 4.
Thomas Frtschek, Inventor,
Witnesses
Howard W. Orr
H. F. Riley
By E. G. Siggers
Attorney

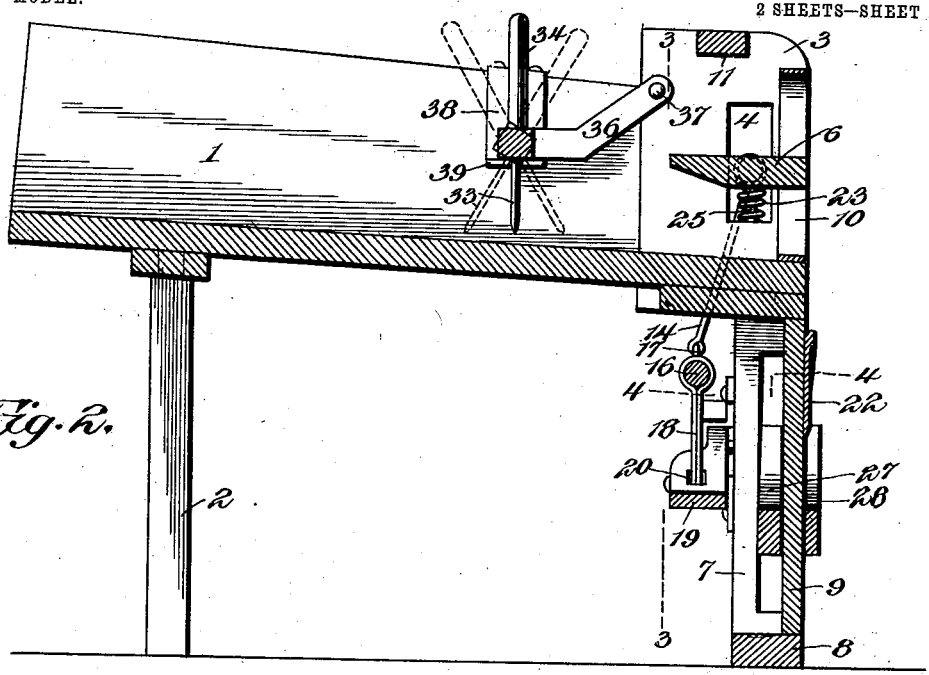

No. 744,328. Patented November 17, 1903.

UNITED STATES PATENT OFFICE.

THOMAS FRTSCHEK, OF DODGE, NEBRASKA.

HAY OR STRAW CUTTER.

SPECIFICATION forming part of Letters Patent No. 744,328, dated November 17, 1903.

Application filed May 4, 1903. Serial No. 155,610. (No model.)

*To all whom it may concern:*

Be it known that I, THOMAS FRTSCHEK, a citizen of the United States, residing at Dodge, in the county of Dodge and State of Nebraska, have invented a new and useful Hay or Straw Cutter, of which the following is a specification.

The invention relates to improvements in hay and straw cutters.

The object of the present invention is to improve the construction of hay and straw cutters and to provide a simple and comparatively inexpensive one capable of convenient operation and adapted to enable hay and straw to be readily and rapidly cut the desired length.

A further object of the invention is to enable the material to be accurately and positively fed to the knife or cutter without liability of the fingers of the operator coming in contact with the blade or cutter.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a hay and straw cutter constructed in accordance with this invention. Fig. 2 is a longitudinal sectional view of the same. Fig. 3 is a transverse sectional view on the line 3 3 of Fig. 2. Fig. 4 is a horizontal sectional view on the line 4 4 of Fig. 2. Fig. 5 is a detail perspective view of the feeder. Fig. 6 is a detail view of one of the inner brackets.

Like numerals of reference designate corresponding parts in all the figures of the drawings.

1 designates a box or trough of the ordinary construction, tapered toward its front portion and adapted to receive the material to be cut. The box or trough which constitutes the upper portion of the frame of the straw-cutter is supported at the back by a leg 2 and is provided at its front portion with upright side pieces 3, having vertical slots 4, receiving the reduced ends 5 of a follower 6. The front portion of the frame is supported by a leg consisting of inclined bars 7, a horizontal bottom bar 8, and a triangular front board or piece 9, secured within the front portion of the space inclosed by the bars 7 and 8.

Within the front portion of the frame is arranged a mouthpiece 10, of approximately rectangular form, secured to the bottom of the trough or box and to the side pieces 3 thereof, which are connected by a top cross-bar 11. The follower projects outward through the slots 4, and its ends receive sleeves or bands 12, having perforated ears 13 and connected by rods or links 14 with similar sleeves or bands 15 of a lower bar 16. The sleeves 15 are provided with upwardly-extending perforated ears 17, and the ends of the rods or links are provided with eyes, which are linked into the perforations of the ears. The lower bar 16 is located beneath the trough, and it is connected at its center by a depending arm 18 with a treadle or foot-lever 19, located below the bar 16 and fulcrumed on one of the bars 7 and projecting outward beyond the other bar in convenient position to be engaged by the foot of the operator. The arm 18, which may be constructed in any manner, preferably consists of a strap of metal doubled between its ends to form a sleeve or band and extended therefrom and pivoted in a slot 20 of the treadle or foot-lever, as clearly illustrated in Fig. 2 of the drawings. The treadle or foot-lever is enlarged, as shown, to receive the foot of the operator, whereby the follower is forced downward into engagement with the hay or straw to compress the same and also to hold the material firmly against the bottom of the trough or box to enable the hay or straw to be effectively operated on by a knife or cutter 22. The follower is automatically raised by coiled springs 23 as soon as pressure is removed from the treadle or foot-lever. The coiled springs, which are interposed between the reduced ends of the follower and L-shaped brackets 24, are disposed on guide-rods 25, secured at their upper ends to the follower and passing through perforations of the brackets 24. The brackets 24 are secured to the outer faces of the sides of the box or trough, at the front portion thereof, and they project outward from the same, as clearly shown in Fig. 2 of the drawings.

The knife or cutter, which is provided at one end with a handle, is pivoted at its other end by a pin 26 or other suitable fastening device to an oscillatory lever, which is composed of inner and outer bars 27 and 28, forming a fork or bifurcation. The inner bar 27 is provided at the pivoted end of the knife with an enlargement 29, spacing it from the outer bar 28 to provide a longitudinal slot or opening and to offset the body portion of the bar 27 from the front bar 28 to enable the inner bar to be arranged in slots 30 of the bars 7 of the front of the frame. The bars 7 are slotted, as clearly shown in Fig. 4, and the oscillatory lever enables the knife or cutter to be readily raised and lowered, and it also forms a pivot or fulcrum for the said knife or cutter.

In order to enable the material to be positively and accurately fed without the hands of the operator coming in contact with the knife or cutter, a feeder 31 is employed. This feeder, which is located within the box or trough, at the front portion thereof, consists of a transverse shaft or spindle 32, provided with a series of pointed fingers 33 and provided with an upwardly-extending handle 34. The shaft or bar 32 is pivoted by pins 35 or other suitable fastening devices to the rear ends of links 36, which are pivoted at their front ends by pins 37 or the like to the inner faces of the side pieces 3 of the box or trough. The links have front and rear portions arranged at an angle, and the front portions incline downward and rearward to permit the rear portions to lie approximately horizontally upon inner supporting-brackets 38. The brackets 38, which are secured to the inner faces of the sides of the trough and to the upper edges thereof, have inwardly-extending bottom flanges 39, arranged to support the shaft 32, and thereby maintain the pointed fingers or pins out of engagement with the bottom of the trough or box. The feeder is adapted to be oscillated, as indicated in Fig. 2 of the drawings, and the links 36 are also adapted to swing upward and downward to permit the feeder to be raised and lowered to engage it with and disengage it from the material. The inner brackets may be mounted on the inner faces of the sides of the trough or box in any other manner.

It will be seen that the straw and hay cutter is simple and comparatively inexpensive in construction, that it is adapted to be readily operated, and that there is no liability of the fingers of the operator coming in contact with the knife or cutter while operating the feeder in the manner described. Also it will be clear that the feeder is capable of oscillation to force the material forward or outward and that it is also adapted to be raised and lowered to engage it with and disengage it from the material.

Having thus fully described my invention, what I claim as new, and desire to secure by Letters Patent, is—

1. In a device of the class described, the combination of a box or trough provided at opposite sides with openings, a follower arranged within the box or trough and having reduced portions extending through both of the openings, brackets mounted on the exterior of the box or trough and located beneath the followers, springs interposed between the follower and the brackets, guide-rods supporting the springs, a lower bar arranged horizontally beneath the box or trough, links connecting the lower bar with the ends of the follower, a foot lever or treadle connected with the said lower bar, and a knife or cutter, substantially as described.

2. In a device of the class described, the combination of a box or trough, oppositely-disposed bars supporting the front end of the box or trough and provided with slots, a piece interposed between the bars and closing the space between the same at the front edges of the bars, a lever composed of two sections spaced apart and pivoted at one end to one of the said bars, one of the sections operating in the said slots, and a knife or cutter pivoted between the sections at the other end of the lever, substantially as described.

3. In a device of the class described, the combination with a cutter, and a box or trough, of a bracket mounted on the box or trough, and depending at the interior thereof, links pivotally connected at one end with the said box or trough, and an oscillatory feeder pivotally connected with the links at the other end thereof and arranged to be supported by the bracket and adapted to oscillate on the latter, substantially as described.

In testimony that I claim the foregoing as my own I have hereto affixed my signature in the presence of two witnesses.

THOMAS FRTSCHEK.

Witnesses:
SAMUEL K. LONGACRE,
HERMAN HOLSTEN.